US008971644B1

(12) United States Patent
Jing et al.

(10) Patent No.: US 8,971,644 B1
(45) Date of Patent: Mar. 3, 2015

(54) SYSTEM AND METHOD FOR DETERMINING AN ANNOTATION FOR AN IMAGE

(75) Inventors: Yushi Jing, San Francisco, CA (US); Alexandru Marius Pasca, Sunnyvale, CA (US); Wei Cai, Atlanta, GA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/352,867

(22) Filed: Jan. 18, 2012

(51) Int. Cl.
*G06K 9/62* (2006.01)

(52) U.S. Cl.
USPC .................................................. 382/224

(58) Field of Classification Search
None
See application file for complete search history.

(56) References Cited

U.S. PATENT DOCUMENTS

| | | | | |
|---|---|---|---|---|
| 6,363,378 | B1 * | 3/2002 | Conklin et al. | 1/1 |
| 7,394,947 | B2 * | 7/2008 | Li et al. | 382/305 |
| 7,542,969 | B1 * | 6/2009 | Rappaport et al. | 1/1 |
| 7,627,556 | B2 * | 12/2009 | Liu et al. | 1/1 |
| 7,961,986 | B1 * | 6/2011 | Jing et al. | 382/305 |
| 7,986,842 | B2 * | 7/2011 | Cooper | 382/228 |
| 8,060,531 | B2 | 11/2011 | Edelstein et al. | |
| 8,090,248 | B2 | 1/2012 | Akutsu | |
| 8,326,091 | B1 * | 12/2012 | Jing et al. | 382/305 |
| 8,352,465 | B1 * | 1/2013 | Jing et al. | 707/723 |
| 8,356,035 | B1 * | 1/2013 | Baluja et al. | 707/741 |
| 2004/0049569 | A1 * | 3/2004 | Ohashi | 709/223 |
| 2006/0143176 | A1 * | 6/2006 | Mojsilovic et al. | 707/6 |
| 2006/0248044 | A1 * | 11/2006 | Zhang et al. | 707/1 |
| 2007/0098266 | A1 * | 5/2007 | Chiu et al. | 382/224 |
| 2007/0130112 | A1 * | 6/2007 | Lin | 707/2 |
| 2007/0245400 | A1 * | 10/2007 | Paek et al. | 725/142 |
| 2007/0271226 | A1 * | 11/2007 | Zhang et al. | 707/3 |
| 2008/0027917 | A1 * | 1/2008 | Mukherjee et al. | 707/3 |
| 2009/0063455 | A1 * | 3/2009 | Li et al. | 707/5 |
| 2009/0083332 | A1 * | 3/2009 | Datta et al. | 707/104.1 |
| 2009/0313243 | A1 * | 12/2009 | Buitelaar et al. | 707/5 |
| 2010/0036797 | A1 * | 2/2010 | Wong et al. | 706/55 |
| 2010/0046842 | A1 * | 2/2010 | Conwell | 382/218 |
| 2010/0070448 | A1 * | 3/2010 | Omoigui | 706/47 |
| 2010/0205205 | A1 * | 8/2010 | Hamel | 707/769 |
| 2010/0223258 | A1 * | 9/2010 | Ghahramani et al. | 707/723 |
| 2010/0226582 | A1 * | 9/2010 | Luo et al. | 382/224 |
| 2011/0016130 | A1 * | 1/2011 | Wennerberg et al. | 707/738 |
| 2011/0072047 | A1 * | 3/2011 | Wang et al. | 707/776 |
| 2011/0302156 | A1 * | 12/2011 | Vadlamani et al. | 707/723 |
| 2011/0317885 | A1 * | 12/2011 | Leung et al. | 382/118 |
| 2011/0320317 | A1 * | 12/2011 | Yuan et al. | 705/26.61 |
| 2011/0320454 | A1 * | 12/2011 | Hill et al. | 707/739 |
| 2012/0014559 | A1 * | 1/2012 | Suehling et al. | 382/103 |
| 2013/0021322 | A1 * | 1/2013 | Joo et al. | 345/418 |
| 2013/0170738 | A1 * | 7/2013 | Capuozzo et al. | 382/159 |

OTHER PUBLICATIONS

Marszatek et al. "Semantic Hierarchies for Visual Object Recognition" 2007.*
Koletsis et al. "SIA: Semantic Image Annotation using Ontologies and Image Content Analysis" 2010.*
Liu, Rosenberg, Rowley, Clustering Billions of Images with Large Scale Nearest Neighbor Search, IEEE Workshop on Applications of Computer Vision (WACV '07), 2007, pp. 1-6.

* cited by examiner

*Primary Examiner* — Vu Le
*Assistant Examiner* — Alexander J Lesnick
(74) *Attorney, Agent, or Firm* — McDermott Will & Emery LLP

(57) ABSTRACT

A plurality of images related to a particular image are determined, and a plurality of annotations associated with the plurality of images are identified. An ontology is determined based on the plurality of annotations, and an image annotation for the particular image is determined based on the ontology. The ontology may be a semantic ontology, for example.

18 Claims, 6 Drawing Sheets

SYSTEM AND METHOD FOR DETERMINING AN ANNOTATION FOR AN IMAGE

TECHNICAL FIELD

This specification relates generally to systems and methods for processing images, and more particularly to systems and methods for determining an annotation for an image.

BACKGROUND

Efficient processing of images is increasingly important for online search engines. Many existing search engines examine images that are available via the Internet and include potentially relevant images in their search results. Examination of an image in connection with an Internet search typically requires analyzing an annotation or other text associated with the image. For example, an image of the Empire State Building may be stored with several annotations, including "Empire State Building," "skyscraper," "building," "structure," "New York City," etc. However, current methods for annotating images are inefficient and slow. For example, many existing systems require manual annotation of images.

SUMMARY

In accordance with an embodiment, a method of determining an annotation for a particular image is provided. A plurality of images related to the particular image are determined, and a plurality of annotations associated with the plurality of images are identified. An ontology is determined based on the plurality of annotations, and an image annotation for the particular image is determined based on the ontology.

In an embodiment, the step of determining a plurality of images related to the particular image may include generating a fingerprint associated with the particular image, and determining the plurality of images related to the particular image, based on the fingerprint. The step of identifying a plurality of annotations associated with the plurality of images may include accessing stored data identifying a stored image and an annotation associated with the stored image.

In an embodiment, the ontology is a semantic ontology comprising a plurality of terms and a plurality of links indicating relationships between the terms. Information defining the relationships between the terms may be obtained from an information resource available via a network. The semantic ontology may further define a hierarchy and assign each of the plurality of terms to a respective level within the hierarchy.

In one embodiment, the step of determining the image annotation for the particular image includes identifying a term within the semantic ontology associated with a highest level within the hierarchy. In another embodiment, the step of determining the image annotation for the particular image includes identifying a plurality of terms within the semantic ontology associated with a highest level within the hierarchy, and identifying a term associated with the highest level that has a greatest number of links.

In another embodiment, the semantic ontology comprises a plurality of links defining relationships between respective terms, and each link is associated with a respective relevance value. A plurality of terms within the semantic ontology associated with a highest level within the hierarchy is identified. A term associated with the highest level is identified based on the relevance value of a link associated with the term.

These and other advantages of the present disclosure will be apparent to those of ordinary skill in the art by reference to the following Detailed Description and the accompanying drawings.

DETAILED DESCRIPTION

Figure 1:
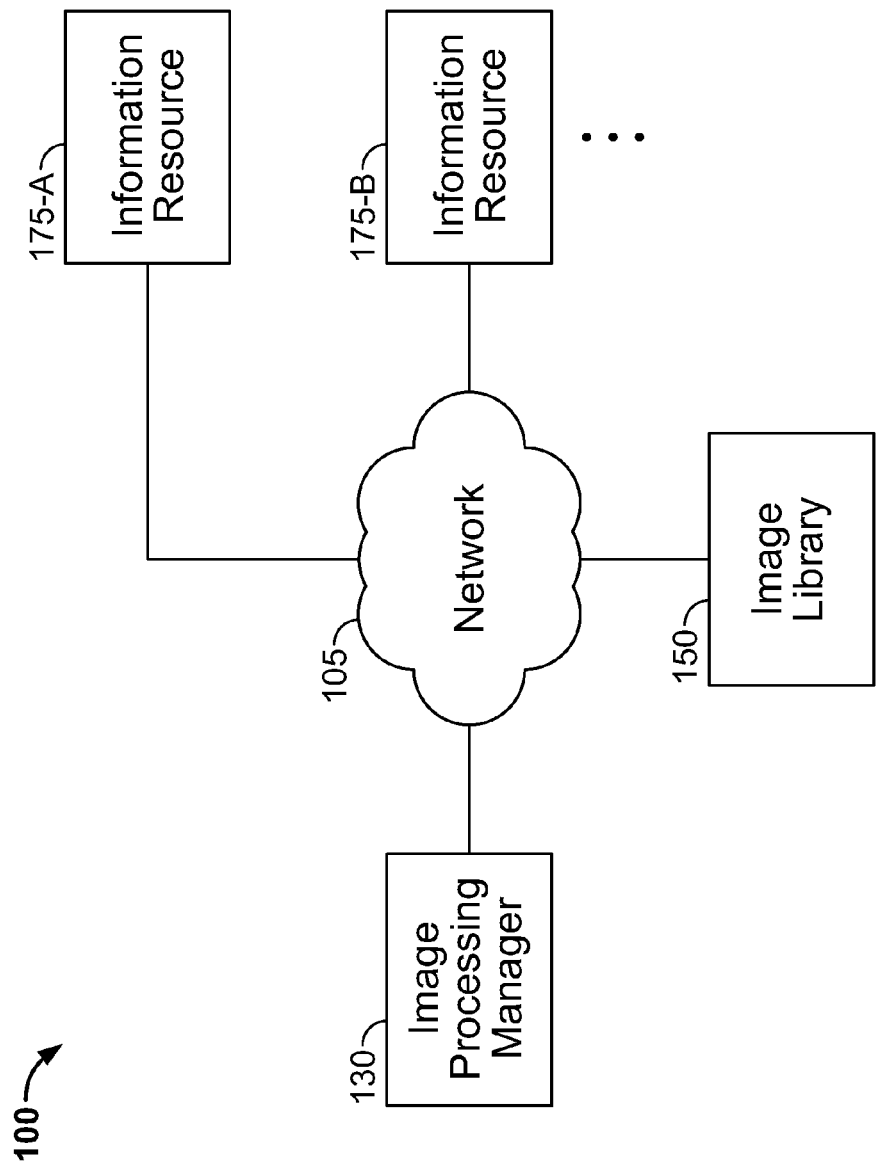
FIG. 1 shows a communication system that may be used to provide image processing services in accordance with an embodiment.

FIG. 1 shows a communication system 100 that may be used to provide image processing services in accordance with an embodiment. Communication system 100 includes a network 105, an image processing manager 130, an image library 150, and several information resources 175-A, 175-B, etc. For convenience, the term "information resource 175" is used herein to refer to any one of information resources 175-A, 175-B, etc. Accordingly, any discussion herein referring to "information resource 175" is equally applicable to each of information resources 175-A, 175-B, etc. Communication system 100 may include more or fewer than two information resources.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Image processing manager 130 provides image processing services. For example, image processing manager 130 may receive an image and determine an appropriate annotation for the image. In order to determine an annotation for a particular image, image processing manager 130 may access various resources such as image library 150 and information resource 175.

Figure 2:
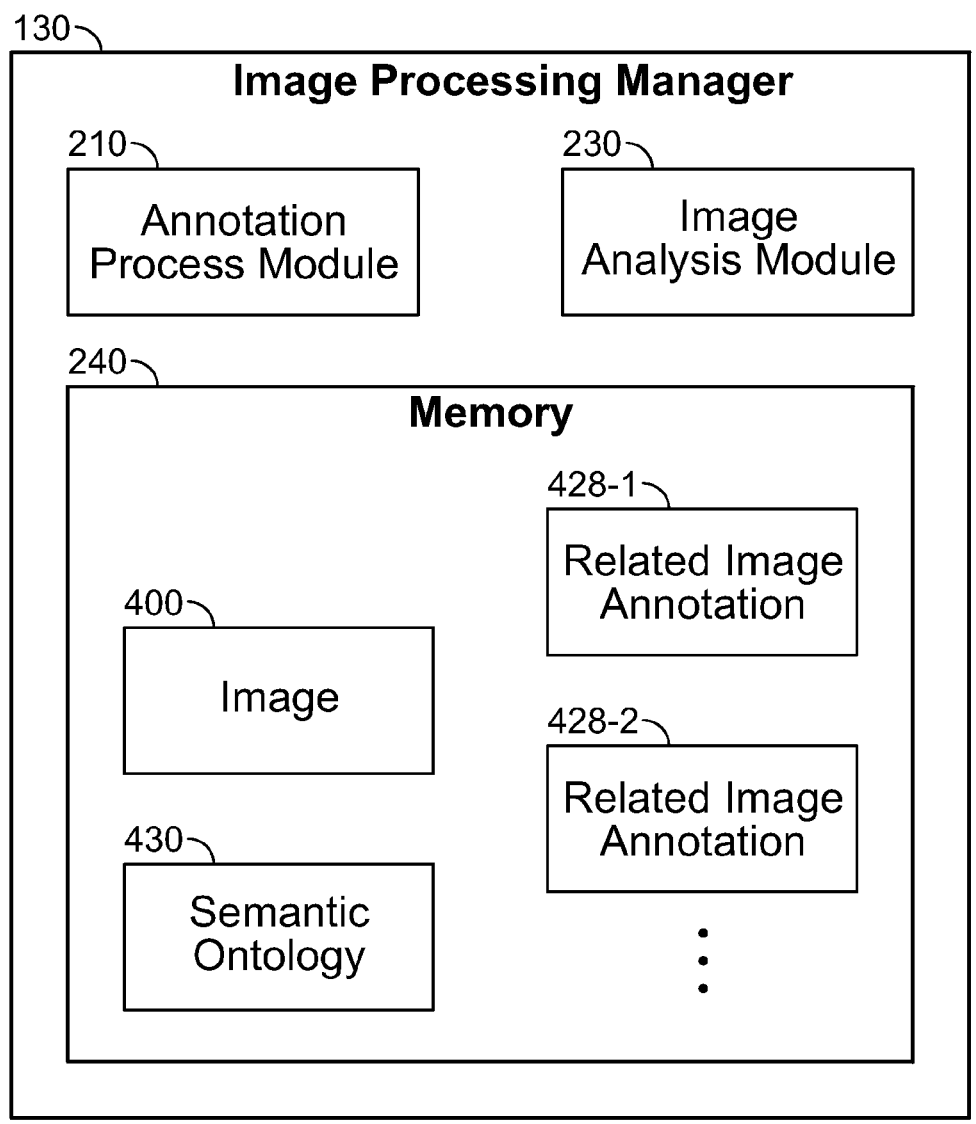
FIG. 2 shows functional components of an image processing manager in accordance with an embodiment.

FIG. 2 shows functional components of image processing manager 130 in accordance with an embodiment. Image processing manager 130 includes an annotation process module 210, an image analysis module 230, and a memory 240. Annotation process module 210 may receive an image and determine an appropriate annotation for the image. Image analysis module 230 examines an image and generates a fingerprint associated with the image. Memory 240 is used by various components of image processing manager 130 to store data, including images, annotations, and other types of data. Image processing manager 130 may include other components not shown in FIG. 2.

Information resource 175 includes a source of information related to various words and/or terms. For example, information source 175 may include sources of linguistic information that are publicly available via the Internet, such as WordNet, which defines a network of terms and sets of terms linked by defined relationships. Information source 175 may also include other types of online sources such as Wikipedia. As used herein, a "term" may be a word ("automobile," for example) or a set of words ("Empire State Building," or "disk drive," for example) having a particular meaning.

Figure 3:
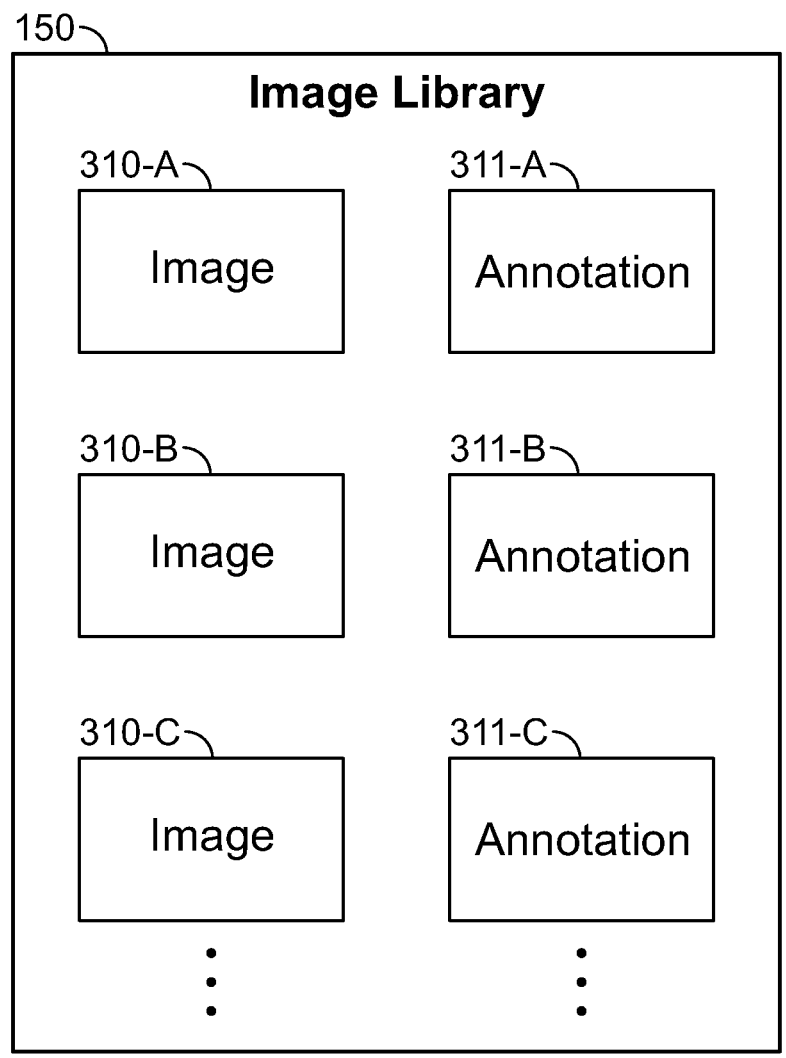
FIG. 3 is an illustration of an exemplary image library in accordance with an embodiment.

Image library 150 includes a source of images. Image library 150 may be publicly available or proprietary. Image library 150 may include annotated images and/or images without annotations. FIG. 3 is an exemplary illustration of image library 150 in accordance with an embodiment. Image library 150 includes a plurality of images, and/or data representing a plurality of images, such as images 310-A, 310-B, 310-C, etc. Image library 150 may also include one or more annotations associated with some or all of the images. In the embodiment of FIG. 3, annotation 311-A is associated with image 310-A, annotation 311-B is associated with image 310-B, and annotation 311-C is associated with image 310-C. Image library 150 may also include images without annotations. In another embodiment, image library 150 may include data identifying images that are available via the Internet or another type of network. For example, image library 150 may include a link (not shown) to an image, such as a Uniform Resource Locator (URL), or other identifier associated with an image. The images, annotations and other data within image library 150 may be stored in a memory or storage device, such as a disk drive, optical disk, etc.

Image processing manager 130 from time to time may determine an annotation for a particular image. For example, image processing manager 130 may receive, from a server or other entity that maintains image library 150, an image, or a link to an image, and a request for an annotation for the image, and in response, generate an annotation for the image. Alternatively, image processing manager 130 may itself identify an image available via the Internet (as a result of a search, for example), and generate an annotation for the image. The image (or link or other identifier for the image), and the annotation may then be stored in image library 150 or in another location, for example.

Figure 4A:
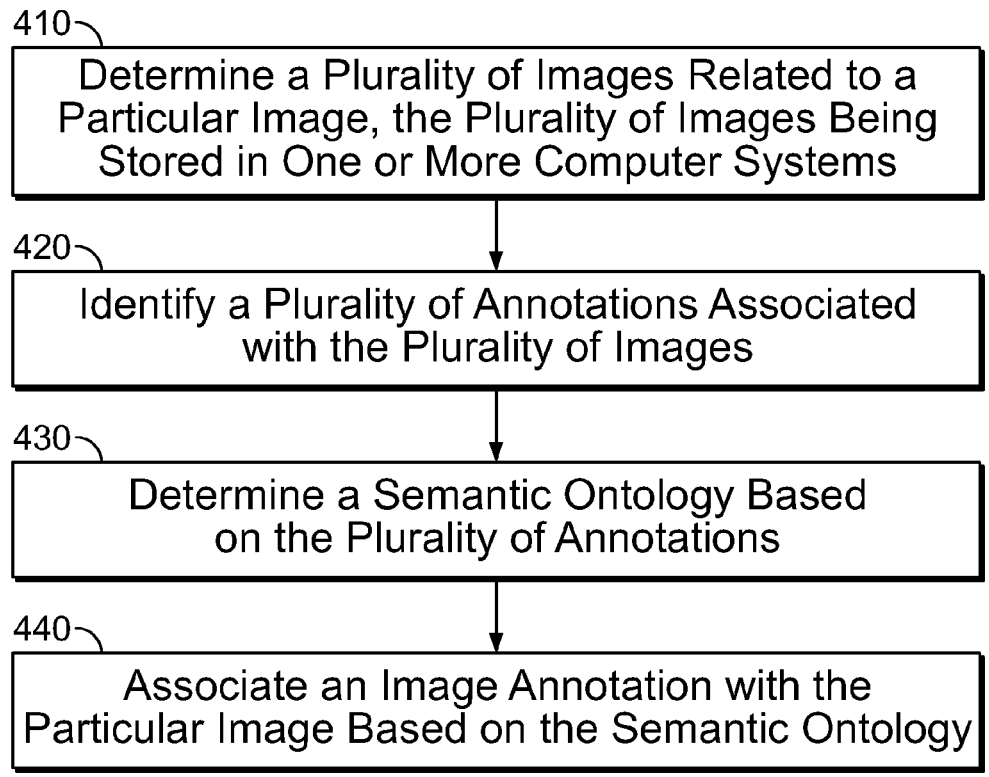
FIG. 4A is a flowchart of a method for determining an annotation for an image in accordance with an embodiment.

FIG. 4A is a flowchart of a method for determining an annotation for an image in accordance with an embodiment. In an embodiment illustrated in FIG. 5, image processing manager 130 receives a new image 500 and a request for an annotation for the new image.

At step 410, a plurality of images related to a particular image, and stored in one or more computer systems, is determined. Image analysis module 230 (shown in FIG. 2) examines image 500 and generates a digital fingerprint representing image 500. For example, image analysis module 230 may use a hash function to generate a digital fingerprint based on image 500. Other methods may be used to generate a digital fingerprint of an image. Methods and systems for generating a fingerprint representing an image are well-known.

Image analysis module 230 also accesses image library 150 and obtains fingerprints of other images. In one embodiment, image analysis module 230 may obtain fingerprints associated with image 310-A, 310-B, 310-C, and other images stored in image library 150. In another embodiment, image analysis module 230 may obtain fingerprints associated with images that are available via the Internet. In one embodiment, image analysis module 230 may generate a fingerprint associated with an image. In other embodiments, image analysis module 230 may retrieve a stored fingerprint associated with an image. Image analysis module 230 compares the fingerprint of image 500 to the fingerprints of other images and identifies a set of related images based on the comparison. For example, image analysis module 230 may select a set of k images having fingerprints that are closest, or most similar, to the fingerprint of image 500. Image analysis module 230 may use a selected algorithm to identify k closest images, for example. For example, a k nearest neighbor (k-NN) search may be performed using a spill-tree. Techniques for performing k-NN searches, including use of spill trees, are known. In the illustrative embodiment of FIG. 5, image analysis module 230 identifies a set of k related images 525 including related images 525-1, 525-2, 525-3, 525-4, 525-5, 525-6, etc.

At step 420, a plurality of annotations associated with the plurality of images are identified. For example, annotation process module 210 (shown in FIG. 2) may retrieve from image library 150 image annotations that are associated with related images 525. In the illustrative embodiment of FIG. 5, related image annotation 528-1 is associated with related image 525-1, related image annotation 528-2 is associated with related image 525-2, related image annotation 528-3 is associated with related image 525-3, related image annotation 528-4 is associated with related image 525-4, related image annotation 528-5 is associated with related image 525-5, related image annotation 528-6 with associated to related image 525-6, etc. In another embodiment, a single related image annotation associated with multiple related images may be identified. In another embodiment, multiple related image annotations associated with a single related image may be identified.

At step 430, a semantic ontology is determined based on the plurality of annotations. In accordance with an embodiment, a semantic ontology defines a network based on a plurality of terms and defines relationships among the terms. A semantic ontology may further define a hierarchy in which terms are assigned to various levels. In one embodiment, the relationship among terms is Is-A, or subconcept-superconcept. For example, specific terms such as "apple," "orange," and "pear" may be assigned to a relatively low level within the hierarchy, while broader, more categorical terms, such as "fruit" (which encompasses "apple," "orange," and "pear") may be assigned to a higher level within the hierarchy. Additional higher levels within the hierarchy may include still broader categorical terms, such as "plant," which encompasses the categorical term "fruit."

Figure 5:
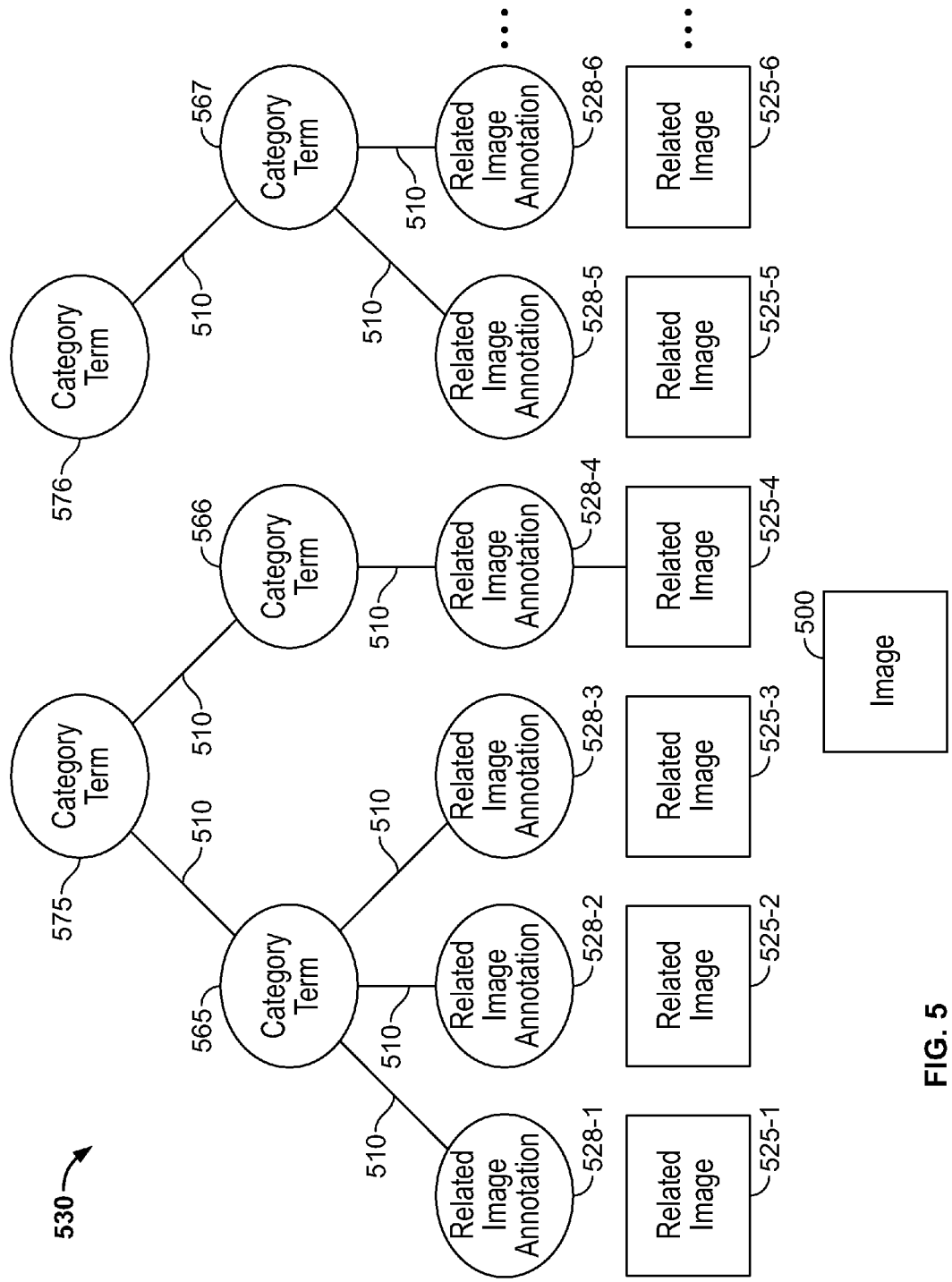
FIG. 5 shows a plurality of images and an associated semantic ontology in accordance with an embodiment.

In order to generate a semantic ontology, annotation process module 210 may access one or more information resources 175 to obtain relevant information. For example, annotation process module 210 may access WordNet, a lexical database of English which groups phrases with a common meaning into synonym sets organized hierarchically, and identify one or more terms that are related to each related image annotation 528. Annotation process module 210 may also obtain information from Wikipedia and other online sources. Based on information obtained in this manner, annotation process module 210 generates a semantic ontology 530 that includes related image annotations 528, and other terms related to related image annotations 528, and which indicates relationships between such terms, as illustrated in FIG. 5.

Semantic ontology 530 includes a term 565, which is a category term related to and encompassing related images annotations 528-1, 528-2, and 528-3; a term 566, which is a category term related to and encompassing related image annotation 528-4; and a term 567, which is a category term related to and encompassing related image annotations 528-5 and 528-6. Semantic ontology 530 also includes a term 575, which is a higher-level category term related to and encompassing category terms 565 and 566, and a term 576, which is a higher-level category term related to and encompassing category term 567. Relationships are indicated in semantic ontology 530 by links 510.

At step 440, an image annotation is associated with the particular image, based on the semantic ontology. Annotation process module 210 selects one or more annotations for image 500 based on the relationships among terms within semantic ontology 530.

Figure 4B:
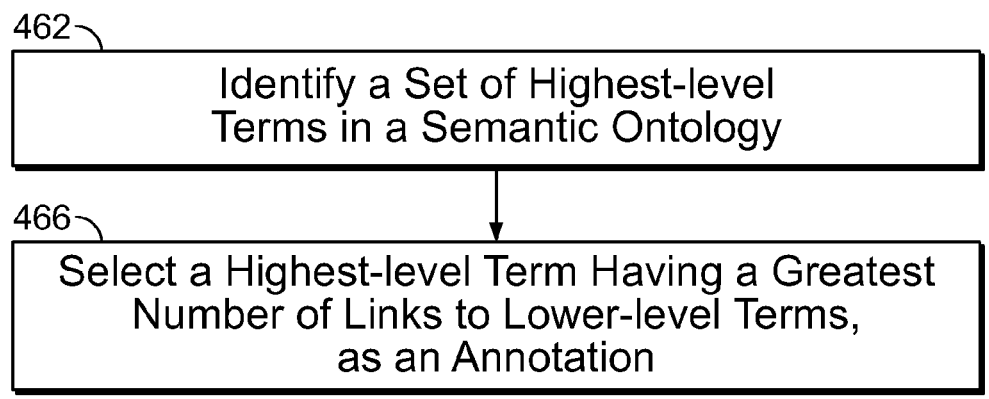
FIG. 4B is a flowchart of a method for determining an annotation for an image in accordance with an embodiment.

FIG. 4B is a flowchart of a method of selecting an annotation for an image based on a semantic ontology in accordance with an embodiment. At step 462, a set of highest level terms in a semantic ontology is identified. In the illustrative embodiment of FIG. 5, annotation process module 210 identifies terms 575 and 576 as belonging to the highest level within semantic ontology 530. At step 466, a highest level term having the greatest number of links to lower level terms is selected as an annotation. Accordingly, annotation process module 210 determines that term 575 has two links 510 to lower level terms, while term 576 has one link 510 to a lower level term. Therefore, annotation process module 210 selects term 575 as an annotation for image 500.

In another embodiment, each link 510 between two terms is assigned a relevance value indicating a measure of the relevance of the two terms to each other. In addition, each related image annotation 528 may be assigned a relevance value indicating its relevance to its associated related image 525. Also, each related image 525 may be assigned a relevance value indicating its relevance to image 500. In this embodiment, an annotation is selected for an image based on the relevance values within the semantic ontology. For example, for each highest level term in the ontology, a total relevance value equal to the sum of all relevance values of all links "below" the highest level term may be computed. Relevance values of all related image annotations, and of all related images, that are linked to the highest term may be included in the total relevance value. A highest level term associated with the greatest total relevance value may then be selected as an annotation.

Annotation process module 210 may also select additional annotations for image 500 from among lower level category terms, using a similar method. For example, annotation process module 210 may examine lower-level terms linked to term 575; in particular, annotation process module 210 compares terms 565 and 566, and determines that term 565, which has three links 510 to lower level terms, has more such links than term 566 (one). Therefore, annotation process module 210 selects term 565 as an additional annotation for image 500.

In various embodiments, the method steps described herein, including the method steps described in FIGS. 4A and/or 4B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4A and/or 4B. Certain steps of the methods described herein, including one or more of the steps of FIGS. 4A and/or 4B, may be performed by a server or by another processor in a network-based cloud-computing system. Certain steps of the methods described herein, including one or more of the steps of FIGS. 4A and/or 4B, may be performed by a client computer in a network-based cloud computing system. The steps of the methods described herein, including one or more of the steps of FIGS. 4A and/or 4B, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4A and/or 4B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
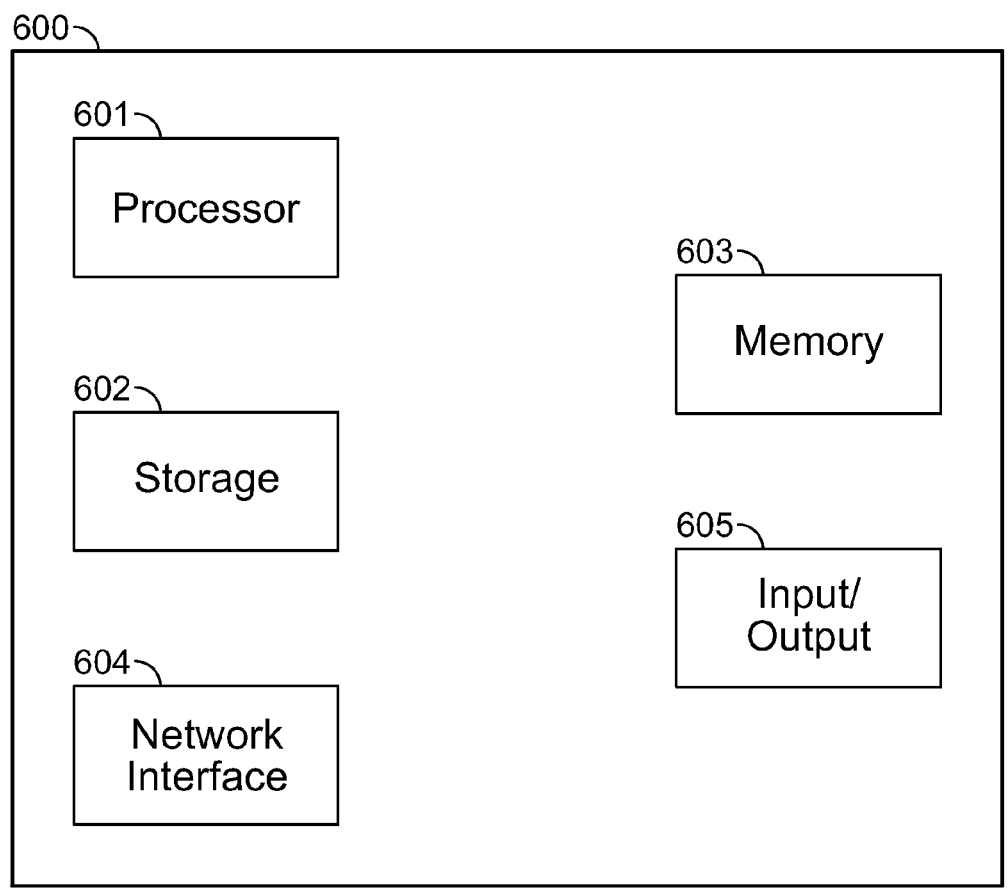
FIG. 6 shows components of a computer that may be used to implement certain embodiments of the invention.

A high-level block diagram of an exemplary computer that may be used to implement systems, apparatus and methods described herein is illustrated in FIG. 6. Computer 600 includes a processor 601 operatively coupled to a data storage device 602 and a memory 603. Processor 601 controls the overall operation of computer 600 by executing computer program instructions that define such operations. The computer program instructions may be stored in data storage device 602, or other computer readable medium, and loaded into memory 603 when execution of the computer program instructions is desired. Thus, the method steps of FIGS. 4A and/or 4B can be defined by the computer program instructions stored in memory 603 and/or data storage device 602 and controlled by the processor 601 executing the computer program instructions. For example, the computer program instructions can be implemented as computer executable code programmed by one skilled in the art to perform an algorithm defined by the method steps of FIGS. 4A and/or 4B.

Accordingly, by executing the computer program instructions, the processor 601 executes an algorithm defined by the method steps of FIGS. 4A and/or 4B. Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors, and may be the sole processor or one of multiple processors of computer 600. Processor 601 may include one or more central processing units (CPUs), for example. Processor 601, data storage device 602, and/or memory 603 may include, be supplemented by, or incorporated in, one or more application-specific integrated circuits (ASICs) and/or one or more field programmable gate arrays (FPGAs).

Data storage device 602 and memory 603 each include a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as a cathode ray tube (CRT) or liquid crystal display (LCD) monitor for displaying information to the user, a keyboard, and a pointing device such as a mouse or a trackball by which the user can provide input to computer 600.

Any or all of the systems and apparatus discussed herein, including image processing manager 130, and image library 150, and components thereof, including annotation process module 210, image analysis module 230, and memory 240, may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of determining an annotation for a particular image, the method comprising:
   determining a plurality of images related to the particular image, the plurality of images stored in one or more computer systems;
   identifying a plurality of annotations associated with the plurality of images;
   generating an ontology for the particular image wherein the ontology comprises:
      a plurality of terms, the plurality of annotations, and the plurality of images arranged in a hierarchy with the plurality of annotations being downstream from the plurality of terms associated with a highest level of the hierarchy, and the plurality of images being downstream from the plurality of annotations, and
      a plurality of links defining relationships between respective terms, annotations, or images, wherein each link is associated with a respective relevance value indicating a measure of relevance between two respective terms, annotations, or images connected by a respective link;
   determining a total relevance value for each term associated with the highest level, wherein for each term associated with the highest level, the total relevance value is a sum of relevance values of links downstream from the term; and
   associating one of the plurality of terms having a highest total relevance value with the particular image as an image annotation.

2. The method of claim 1, wherein the step of determining a plurality of images related to the particular image further comprises:
   generating a fingerprint associated with the particular image; and
   determining the plurality of images related to the particular image, based on the fingerprint associated with the particular image and fingerprints associated with the plurality of images.

3. The method of claim 1, further comprising receiving the particular image and a request for annotation of the particular image,
   wherein generating an ontology for the particular image is in response to receiving the particular image and a request for annotation of the particular image.

4. The method of claim 1, wherein each image of the plurality of images is associated with an image relevance value, wherein the image relevance value is an indication of a measure of relevance to the particular image, and wherein the total relevance value is further based on the sum of image relevance values of images downstream from each term associated with the highest level.

5. The method of claim 1, further comprising:
   determining a total relevance value for each term in a plurality of terms in a next highest level of the ontology; and
   associating one of the terms in the plurality of terms in the next highest level of the ontology with the particular image as an image annotation.

6. The method of claim 1, further comprising:
   Obtaining information defining the relationships between the plurality of terms from an information resource available via a network.

7. The method of claim 1, wherein the semantic ontology assigns each of the plurality of terms to a respective level within the hierarchy.

8. The method of claim 7, comprising:
identifying as the image annotation a term within the semantic ontology associated with the highest level within the hierarchy.

9. The method of claim 8, wherein the step of determining the image annotation for the particular image further comprises:
identifying the plurality of terms within the semantic ontology associated with the highest level within the hierarchy; and
identifying as the image annotation a term associated with the highest level that has a greatest number of links.

10. A non-transitory computer readable medium having program instructions stored thereon, that, in response to execution by a processor, cause a computing device to perform operations comprising:
determining a plurality of images related to the particular image;
identifying a plurality of annotations associated with the plurality of images;
generating an ontology for the particular image wherein the ontology comprises:
a plurality of terms, the plurality of annotations, and the plurality of images arranged in a hierarchy with the plurality of annotations being downstream from the plurality of terms associated with a highest level of the hierarchy, and the plurality of images being downstream from the plurality of annotations, and
a plurality of links defining relationships between respective terms, annotations, or images, wherein each link is associated with a respective relevance value indicating a measure of relevance between two respective terms, annotations, or images connected by a respective link;
determining a total relevance value for each term associated with the highest level, wherein for each term associated with the highest level, the total relevance value is a sum of relevance values of links downstream from the term; and
associating one of the plurality of terms having a highest total relevance value with the particular image as an image annotation.

11. The non-transitory computer readable medium of claim 10, further comprising instructions defining the steps of:
generating a fingerprint associated with the particular image; and
determining the plurality of images related to the particular image, based on the fingerprint associated with the particular image and fingerprints associated with the plurality of images.

12. The non-transitory computer readable medium of claim 10, further comprising instructions defining the step of receiving a request for annotation of the particular image,
wherein generating an ontology for the particular image is in response to receiving the request for annotation of the particular image.

13. The non-transitory computer readable medium of claim 10, further comprising instructions defining the step of:
obtaining information defining relationships between the plurality of terms from an information resource available via a network.

14. The non-transitory computer readable medium of claim 10, wherein the semantic ontology assigns each of the plurality of terms to a respective level within the hierarchy.

15. The non-transitory computer readable medium of claim 14, further comprising instructions defining the step of:
identifying as the image annotation a term within the semantic ontology associated with the highest level within the hierarchy.

16. The non-transitory computer readable medium of claim 15, further comprising instructions defining the step of:
identifying the plurality of terms within the semantic ontology associated with the highest level within the hierarchy; and
identifying as the image annotation a term associated with the highest level that has a greatest number of links.

17. A system comprising one or more processors and a non-transitory computer readable medium having program instructions stored thereon, that, in response to execution by a processor, cause a computing device to perform operations comprising:
determining a plurality of images related to the particular image;
identifying a plurality of annotations associated with the plurality of images;
generating an ontology for the particular image wherein the ontology comprises:
a plurality of terms, the plurality of annotations, and the plurality of images arranged in a hierarchy with the plurality of annotations being downstream from the plurality of terms associated with a highest level of the hierarchy, and the plurality of images being downstream from the plurality of annotations, and
a plurality of links defining relationships between respective terms, annotations, or images, wherein each link is associated with a respective relevance value indicating a measure of relevance between two respective terms, annotations, or images connected by a respective link;
determining a total relevance value for each term associated with the highest level, wherein for each term associated with the highest level, the total relevance value is a sum of relevance values of links downstream from the term; and
associating one of the plurality of terms having a highest total relevance value with the particular image as an image annotation.

18. The system of claim 17, wherein the non-transitory computer readable medium further comprises program instructions stored thereon, that, in response to execution by a processor, cause a computing device to perform operations comprising:
generating a fingerprint associated with the particular image; and
determining the plurality of images related to the particular image, based on the fingerprint associated with the particular image and fingerprints associated with the plurality of images.

* * * * *